US011746216B2

(12) United States Patent
Shin et al.

(10) Patent No.: US 11,746,216 B2
(45) Date of Patent: Sep. 5, 2023

(54) POLYMER COMPOSITION, CROSSLINKED POLYMER, AND TIRE

(71) Applicant: ENEOS Materials Corporation, Tokyo (JP)

(72) Inventors: Kanyou Shin, Tokyo (JP); Junji Kawai, Tokyo (JP); Noriko Mashimo, Tokyo (JP)

(73) Assignee: ENEOS Materials Corporation, Tokyo (JP)

( * ) Notice: Subject to any disclaimer, the term of this patent is extended or adjusted under 35 U.S.C. 154(b) by 187 days.

(21) Appl. No.: 17/286,815

(22) PCT Filed: Oct. 24, 2019

(86) PCT No.: PCT/JP2019/041630
§ 371 (c)(1),
(2) Date: Apr. 19, 2021

(87) PCT Pub. No.: WO2020/085416
PCT Pub. Date: Apr. 30, 2020

(65) Prior Publication Data
US 2021/0371629 A1     Dec. 2, 2021

(30) Foreign Application Priority Data
Oct. 25, 2018   (JP) ................... 2018-200843

(51) Int. Cl.
| C08L 9/06 | (2006.01) |
| B60C 1/00 | (2006.01) |
| B60C 11/00 | (2006.01) |
| C08L 15/00 | (2006.01) |

(52) U.S. Cl.
CPC .............. *C08L 9/06* (2013.01); *B60C 1/0016* (2013.01); *B60C 11/0008* (2013.01); *C08L 15/00* (2013.01); *B60C 2011/0025* (2013.01); *C08L 2205/02* (2013.01); *C08L 2312/00* (2013.01)

(58) Field of Classification Search
CPC ........ C08L 9/06; C08L 15/00; C08L 2205/02; C08L 2312/00; B60C 1/0016; B60C 11/0008; B60C 2011/0025
See application file for complete search history.

(56) References Cited

U.S. PATENT DOCUMENTS

| 6,077,899 A | * | 6/2000 | Yatsuyanagi | ........... C08L 15/00 525/193 |
| 2003/0199669 A1 | * | 10/2003 | Saito | ........................ C08K 3/36 528/393 |
| 2020/0032037 A1 | * | 1/2020 | Takano | .................... C08L 15/00 |

FOREIGN PATENT DOCUMENTS

| JP | H1087887 | 4/1998 |
| JP | 2017210543 | 11/2017 |
| WO | 0123467 | 4/2001 |
| WO | 2016194316 | 12/2016 |
| WO | WO 2018/186367 | * 10/2018 |

OTHER PUBLICATIONS

"Search Report of Europe Counterpart Application", dated Jul. 21, 2022, p. 1-p. 6.
"International Search Report (Form PCT/ISA/210) of PCT/JP2019/041630", dated Jan. 28, 2020, with English translation thereof, pp. 1-6.
"Office Action of Korea Counterpart Application", dated Jun. 16, 2022, with English translation thereof, p. 1-p. 10.
"Office Action of China Counterpart Application", dated Mar. 22, 2023, with English translation thereof, p. 1-p. 17.
"Office Action of Taiwan Counterpart Application", dated Jun. 12, 2023, with English translation thereof, p. 1-p. 13.
"Notice of Reasons for Refusal of Japan Counterpart Application", dated Jul. 11, 2023, with English translation thereof, p. 1-p. 9.

* cited by examiner

*Primary Examiner* — Doris L Lee
(74) *Attorney, Agent, or Firm* — JCIPRNET

(57) ABSTRACT

A polymer composition characterized by containing a diene-based polymer (A) and a filler (B), the diene-based polymer (A) containing the polymer (A1) and the polymer (A2) described below. Polymer (A1): A diene-based polymer that is a polymer of a conjugate diene compound or a copolymer of the conjugate diene compound and an aromatic vinyl compound, the diene-based polymer being modified with a polar group having affinity for the filler (B), wherein the aromatic vinyl content is 25 mass % or less, and the modification rate is 30-100%. Polymer (A2): A diene-based polymer that is a copolymer of an aromatic vinyl compound and a conjugate diene compound including 1,3-butadiene, wherein the aromatic vinyl content is 30-50 mass %, the vinyl content is 5-30 mass %, and the peak molecular weight in terms of polystyrene measured using gel permeation chromatography is 400,000 to 2,000,000.

9 Claims, No Drawings

POLYMER COMPOSITION, CROSSLINKED POLYMER, AND TIRE

CROSS-REFERENCE TO RELATED APPLICATION

This application is a 371 application of the international PCT application serial no. PCT/JP2019/041630, filed on Oct. 24, 2019, which claims the priority benefit of Japan application no. 2018-200843, filed on Oct. 25, 2018. The entirety of each of the above-mentioned patent applications is hereby incorporated by reference herein and made a part of this specification.

TECHNICAL FIELD

The present invention relates to a polymer composition, a crosslinked polymer, and a tire produced using the crosslinked polymer.

BACKGROUND ART

In recent years, regarding global actions on carbon dioxide emission control in response to the growing interest in environmental issues, a demand for reducing the fuel consumption of vehicles has been intensifying. In order to meet such a demand, there is another demand for reducing rolling resistance regarding tire performance. Conventionally, as a method for reducing the rolling resistance of tires, a method for optimizing tire structures has been studied; however, at the moment, the application of a polymer composition having a low tan δ (hereinafter, also referred to as "low-loss properties" or "low-hysteresis loss characteristics") and excellent low exothermic properties in tiers is also being performed as an ordinary method.

As a method for obtaining such a polymer composition having low exothermic properties, the reduction of the amount of a filler such as carbon black or silica, the use of carbon black having large particle diameters, or the like is conceivable, but in any of such methods, it is not possible to avoid deterioration in the reinforcement, wear resistance, and grip properties on wet pavement (hereinafter, also referred to as "wet-grip properties") of the polymer composition.

Therefore, studies are underway to provide a polymer composition suitable for manufacturing a tire that is satisfactory in terms of not only low-loss properties but also wear resistance by formulating rubbers having different glass transition temperatures (Tg) (for example, refer to Patent Literature 1).

CITATION LIST

Patent Literature

[Patent Literature 1]
International Publication WO 2016/194316

SUMMARY OF INVENTION

Technical Problem

However, in the case of using the polymer composition disclosed in Patent Literature 1, there has been a problem in that it is not possible to obtain sufficient performance in terms of wet grip properties and mechanical characteristics.

Therefore, the present invention provides a polymer composition suitable for manufacturing a tire that is not only excellent in terms of low-loss properties and wear resistance, but also excellent in terms of wet grip performance and mechanical characteristics in a highly balanced manner. In addition, the present invention provides a tire that is not only excellent in terms of low-loss properties and wear resistance, but also excellent in terms of wet grip performance and mechanical characteristics in a highly balanced manner.

Solution to Problem

The present invention can be realized as the following aspects.

An aspect of a polymer composition according to the present invention is
a polymer composition containing a diene-based polymer (A) and a filler (B),
in which the diene-based polymer (A) contains a polymer (A1) and a polymer (A2).
Polymer (A1): A diene-based polymer that is a polymer of a conjugate diene compound or a copolymer of a conjugate diene compound and an aromatic vinyl compound, the diene-based polymer being modified with a polar group having affinity for the filler (B), in which an aromatic vinyl content is 25 mass % or less, and a modification rate is 30-100%.
Polymer (A2): A diene-based polymer that is a copolymer of an aromatic vinyl compound and a conjugate diene compound containing 1,3-butadiene, in which an aromatic vinyl content is 30-50 mass %, a vinyl content is 5-30 mass %, and a peak molecular weight in terms of polystyrene measured by gel permeation chromatography is 400,000 to 2,000,000.
In an aspect of the polymer composition,
the polar group in the polymer (A1) that has affinity for the filler (B) can be a functional group having one or more elements selected from oxygen, sulfur, phosphorus, nitrogen, and tin.
In any aspect of the polymer composition,
a peak molecular weight of the polymer (A1) can be 5,000 to 300,000.
In any aspect of the polymer composition,
a ratio (Mw/Mn) of a weight-average molecular weight (Mw) to a number-average molecular weight (Mn) of the polymer (A2) can be 1.5 to 3.0.
In any aspect of the polymer composition,
the polymer (A2) is a modified polymer modified with a polar group having affinity for the filler (B), and a modification rate of the polymer (A2) can be greater than 0% and 30% or less.
In any aspect of the polymer composition,
a mass ratio (polymer (A1):polymer (A2)) between the polymer (A1) and the polymer (A2) in the diene-based polymer (A) can be 20:80 to 80:20.
Any aspect of the polymer composition, containing
30 to 150 parts by mass of the filler (B) with respect to 100 parts by mass of the diene-based polymer (A).
Any aspect of the polymer composition, further containing
a crosslinking agent.
An aspect of a crosslinked polymer according to the present invention is
produced using any aspect of the polymer composition.

An aspect of a tire according to the present invention, in which the any aspect of the crosslinked polymer is used.

Advantageous Effects of Invention

According to the polymer composition according to the present invention, it is possible to manufacture a tire that is not only excellent in terms of low-loss properties and wear resistance, but also excellent in terms of wet grip performance and mechanical characteristics in a highly balanced manner.

DESCRIPTION OF EMBODIMENTS

Hereinafter, a preferred embodiment according to the present invention will be described in detail. The present invention is not limited only to the embodiment described below and is assumed to be understood to include a variety of modification examples performed within the gist of the present invention.

In the present specification, a numerical range expressed using "to" indicates that the numerical values before and after "to" are included as a lower limit value and an upper limit value.

1. POLYMER COMPOSITION

A polymer composition according to the present embodiment is a polymer composition containing a diene-based polymer (A) and a filler (B), in which the diene-based polymer (A) contains a polymer (A1) and a polymer (A2).

Polymer (A1): A diene-based polymer that is a polymer of a conjugate diene compound or a copolymer of a conjugate diene compound and an aromatic vinyl compound, the diene-based polymer being modified with a polar group having affinity for the filler (B), in which the aromatic vinyl content is 25 mass % or less, and the modification rate is 30-100%.

Polymer (A2): A diene-based polymer that is a copolymer of an aromatic vinyl compound and a conjugate diene compound containing 1,3-butadiene, in which the aromatic vinyl content is 30-50 mass %, the vinyl content is 5-30 mass %, and the peak molecular weight in terms of polystyrene measured by gel permeation chromatography is 400,000 to 2,000,000.

When the modification rate of the polymer (A1) having a low molecular weight is increased in the polymer composition according to the present embodiment, it is possible to manufacture a tire that is not only excellent in terms of low-loss properties and wear resistance, but also excellent in terms of wet grip performance and mechanical characteristics in a highly balanced manner.

Hereinafter, each component that is contained in the polymer composition according to the present embodiment will be described.

1.1. Diene-Based Polymer (A)

The polymer composition according to the present embodiment contains the polymer (A1) and the polymer (A2) as the diene-based polymer (A) and may contain a different polymer other than the polymer (A1) and the polymer (A2). In the present specification, the polymer (A1), the polymer (A2), and the different polymer will also be collectively referred to as "rubber component". In addition, the polymer composition according to the present embodiment needs to contain at least one kind of each of the polymer (A1) and the polymer (A2) and may contain two or more kinds of each.

1.1.1 Polymer (A1)

The polymer composition according to the present embodiment contains the polymer (A1) as the diene-based polymer (A). The polymer (A1) contains a repeating unit derived from a conjugate diene compound.

Examples of the conjugate diene compound that is used in polymerization include 1,3-butadiene, isoprene, 2,3-dimethyl-1,3-butadiene, 1,3-pentadiene, 1,3-hexadiene, 1,3-heptadiene, 2-phenyl-1,3-butadiene, 3-methyl-1,3-pentadiene, 2-chloro-1,3-butadiene, and the like. Among these, 1,3-butadiene, isoprene, and 2,3-dimethyl-1,3-butadiene are preferred, and 1,3-butadiene is more preferred. One kind of the conjugate diene compound may be used singly or two or more kinds of the conjugate diene compounds may be used in combination. The vinyl content (the amount of a 1,2-coupled butadiene unit) of the polymer (A1) is not particularly limited.

The polymer (A1) may be a homopolymer of a conjugate diene compound, but may be a copolymer of a conjugate diene compound and an aromatic vinyl compound from the viewpoint of increasing the strength of rubber.

Examples of the aromatic vinyl compound that is used in polymerization include styrene, 2-methylstyrene, 3-methylstyrene, 4-methylstyrene, α-methylstyrene, 2,4-dimethylstyrene, 2,4-diisopropylstyrene, 4-tert-butylstyrene, 5-tert-butyl-2-methylstyrene, vinylethylbenzene, divinylbenzene, trivinylbenzene, divinylnaphthalene, tert-butoxystyrene, vinylbenzyldimethylamine, (4-vinylbenzyl)-dimethylaminoethyl ether, N,N-dimethylaminoethylstyrene, N,N-dimethylaminomethylstyrene, 2-ethylstyrene, 3-ethylstyrene, 4-ethylstyrene, 2-tert-butylstyrene, 3-tert-butylstyrene, 4-tert-butylstyrene, vinylxylene, vinylnaphthalene, vinylpyridine, diphenylethylene, tertiary amino group-containing diphenylethylene (for example, 1-(4-N,N-dimethylaminophenyl)-1-phenylethylene and the like), and the like. Among these, styrene is preferred. One kind of the aromatic vinyl compound may be used singly or two or more kinds of the aromatic vinyl compounds may be used in combination.

In a case where the polymer (A1) contains a repeating unit derived from an aromatic vinyl compound, when the content of all repeating units in the polymer (A1) is set to 100 mass %, the content of the repeating unit derived from an aromatic vinyl compound (also referred to as "aromatic vinyl content") is 25 mass % or less and preferably 20 mass % or less. When the polymer (A1) having an aromatic vinyl content within the above-described range is contained, a polymer composition which is obtained enables the production of a crosslinked polymer being superior in terms of low-loss properties, wear resistance, wet grip performance, and mechanical characteristics.

The polymer (A1) may have a repeating unit derived from a different monomer other than a repeating unit derived from a conjugate diene compound and a repeating unit derived from an aromatic vinyl compound. Examples of a different monomer include acrylonitrile, methyl (meth)acrylate, ethyl (meth)acrylate, hydroxyethyl (meth)acrylate, and the like. The percentage content of the repeating unit derived from a different monomer is preferably set to 10 mass % or less and more preferably set to 5 mass % or less when the total amount of all of the repeating units is set to 100 mass %.

The peak temperature of the tan δ temperature dispersion curve of the polymer (A1) is preferably −110° C. or higher and lower than −30° C., more preferably −100° C. or higher and −40° C. or lower, and particularly preferably −80° C. or higher and −40° C. or lower. When the peak temperature of the tan δ temperature dispersion curve of the polymer (A1) is within the above-described range, there is a case where it is possible to satisfy having both favorable rubber characteristics at low temperatures and favorable wet grip performance. The tan δ temperature dispersion curve of the rubber component can be measured using, for example, a viscoelastic spectrometer from Toyo Seiki Seisaku-sho, Ltd. under conditions of a strain of 1% and a frequency of 50 Hz.

The polymer (A1) is modified with a polar group having affinity for the filler (B). The polar group having affinity for the filler (B) is not particularly limited, but is preferably a functional group containing one or more elements selected from oxygen, sulfur, phosphorus, nitrogen, and tin. Among such functional groups, a functional group containing one or more elements selected from oxygen and nitrogen is more preferred.

The polymer (A1) may be fully made of a polymer modified with a polar group having affinity for the filler (B) (modified polymer) or also may be made of a mixture of a modified polymer and a non-modified polymer. The modification rate of the polymer (A1) with respect to a polar group having affinity for the filler (B) is 30-100%, preferably 40-100%, and more preferably 50-100%. When the modification rate of the polymer (A1) is within the above-described range, it is possible to strengthen the interaction between the filler (B) and the polymer (A1). In such a case, since the number of free terminals in the diene-based polymer (A) decreases, and the filler (B) is finely dispersed, it is possible to improve hysteresis loss properties.

In addition, in a case where the polymer (A2) is a modified polymer, the polar group concentration per unit mass of the polymer (A1) becomes higher than the polar group concentration per unit mass of the polymer (A2) described below. Since the polar group concentration per unit mass of the polymer (A1) is higher than the polar group concentration per unit mass of the polymer (A2), a number of terminals of the polymer (A1) and the filler (B) bond to each other increases, whereby the number of free terminals in the diene-based polymer (A) decreases, and the filler (B) is finely dispersed. Therefore, it is possible to improve hysteresis loss properties.

The number-average molecular weight (Mn) of the polymer (A1) is preferably smaller than the number-average molecular weight (Mn) of the polymer (A2). For example, in a case where the modification rates of the polymer (A1) and the polymer (A2) by the polar group having affinity for the filler (B) are substantially identical to each other, it is possible to increase the polar group concentration per unit mass of the polymer (A1) to be higher than the polar group concentration per unit mass of the polymer (A2) by forming the above-described relationship of the number-average molecular weights. In such a case, a larger amount of the filler (B) is unevenly distributed in the polymer (A1) phase, and it is easy to obtain more excellent low-loss properties, wear resistance, wet grip performance, and mechanical characteristics. The "number-average molecular weight (Mn)" refers to the peak molecular weight (Mn) in terms of polystyrene measured by gel permeation chromatography.

The peak molecular weight in terms of polystyrene measured by gel permeation chromatography of the polymer (A1) is preferably 5,000 to 300,000 and more preferably 10,000 to 250,000. When the peak molecular weight of the polymer (A1) is within the above-described range, it is easy to obtain more excellent low-loss properties, wear resistance, wet grip performance, and mechanical characteristics.

When the content of the entire rubber component is set to 100 mass %, the percentage content of the polymer (A1) is preferably 20-80 mass %, more preferably 30-80 mass %, and particularly preferably 50-70 mass %. The percentage content of the polymer (A1) is advantageously within the above-described range since in this case it is possible to obtain superior low-loss properties, wear resistance, wet grip performance, and mechanical characteristics.

<Method for Synthesizing Polymer (A1)>

The method for synthesizing the polymer (A1) is not particularly limited, and it is possible to use methods such as anionic polymerization, coordination polymerization, and emulsion polymerization. A modifying agent for introducing the polar group having affinity for the filler (B) into the polymer (A1) may be a modifying agent that reacts with a polymerization active terminal of anionic polymerization or coordination polymerization or may be an amide part of a lithium amide compound that is used as a polymerization initiator. In addition, the modifying agent may be copolymerized as a monomer in emulsion polymerization.

In a case where the polymer (A1) is a copolymer having the repeating unit derived from the conjugate diene compound and the repeating unit derived from the aromatic vinyl compound, the polymer (A1) is preferably a copolymer containing 1,3-butadiene and styrene in a monomer composition from the viewpoint of excellent livingness in anionic polymerization. The copolymer preferably has a random copolymerization part in which the distributions of the conjugate diene compound and the aromatic vinyl compound are not regular and may further have a block part made of the conjugate diene compound or the aromatic vinyl compound.

In addition, the proportion of the aromatic vinyl compound used at the time of synthesizing the polymer (A1) is preferably set to 0-25 mass % and more preferably set to 0-20 mass % from the viewpoint of improving the balance between the low hysteresis loss characteristics and the wet skid resistance of a crosslinked polymer to be obtained when the total amount of the conjugate diene compound and the aromatic vinyl compound that are used in polymerization is set to 100 mass %. The percentage content of the repeating unit derived from the aromatic vinyl compound in the copolymer can be measured by $^1$H-NMR.

As the polymerization method to be used, any of a solution polymerization method, a gas-phase polymerization method, a bulk polymerization method may be used, but the solution polymerization method is preferred. In addition, as the polymerization type, any of a batch type and a continuous type may be used. In the case of using the solution polymerization method, as a specific example of the polymerization method, a method in which monomers containing a conjugate diene compound are polymerized in an organic solvent in the presence of a polymerization initiator and a randomizer that is used if necessary may be exemplified.

As the polymerization initiator, it is possible to use at least any of an alkali metal compound and an alkaline-earth metal compound. Specific examples thereof include alkyl lithium compounds such as methyllithium, ethyllithium, n-propyllithium, n-butyllithium, sec-butyllithium, and tert-butyllithium; 1,4-dilithiobutane, phenyllithium, stilbene lithium, naphthyllithium, 1,3-bis(1-lithio-1,3-dimethylpentyl)benzene, 1,3-phenylenebis(3-methyl-1-phenyl pentylidene)dilithium, naphthyl sodium, naphthyl potassium, di-n-butyl-magnesium, di-n-hexylmagnesium, ethoxypotassium, calcium stearate, and the like. Among these, lithium compounds are preferred. The total amount of the polymerization initiator used is preferably set to 0.2-20 mmol with respect to 100 g of the monomers that are used in polymerization.

The polymerization reaction may be performed using a mixture of, as the initiator, at least any of an alkali metal compound and an alkaline-earth metal compound and a compound having a polar group having affinity for the filler (B). When polymerization is performed in the presence of the mixture, it is possible to modify a polymerization initiating terminal of the diene-based polymer with a polar group having affinity for the filler (B). As a compound having a polar group having affinity for the filler (B) that is used for the modification of the polymerization initiating terminal, a nitrogen-containing compound such as a secondary amine compound is particularly preferred. Specific examples of the nitrogen-containing compound include dimethylamine, diethylamine, dipropylamine, dibutylamine, dodecamethyleneimine, N,N'-dimethyl-N'-trimethylsilyl-1,6-diaminohexane, piperidine, pyrrolidine, hexamethyleneimine, heptamethyleneimine, dicyclohexylamine, N-methylbenzylamine, di-(2-ethylhexyl)amine, diallylamine, morpholine, N-(trimethylsilyl)piperidine, N-(tert-butyldimethylsilyl)piperidine, 1,3-ditrimethylsilyl-1,3,5-triazinane, and the like.

In the case of performing polymerization in the presence of the mixture, the polymerization may be performed by mixing at least any of the alkali metal compound and the alkaline-earth metal compound and the compound having the polar group having affinity for the filler (B) in advance and adding the mixture to the polymerization system. Alternatively, the polymerization may be performed by adding at least any of the alkali metal compound and the alkaline-earth metal compound and the compound having the polar group having affinity for the filler (B) to the polymerization system and mixing both components into the polymerization system.

The randomizer can be used for the purpose of the adjustment or the like of the vinyl coupling content that indicates the percentage content of vinyl couplings (1,2-coupling and 3,4-coupling) in the polymer. Examples of the randomizer include dimethoxybenzene, tetrahydrofuran, dimethoxyethane, diethylene glycol dibutyl ether, diethylene glycol dimethyl ether, 2,2-di(tetrahydrofuryl)propane, 2-(2-ethoxyethoxy)-2-methylpropane, triethylamine, pyridine, N-methylmorpholine, tetramethylethylenediamine, and the like. One kind of the randomizer may be used singly or two or more kinds of the randomizers may be used in combination.

The organic solvent that is used in polymerization may be an organic solvent that is inert in the reaction, and it is possible to use, for example, an aliphatic hydrocarbon, an alicyclic hydrocarbon, an aromatic hydrocarbon, and the like. Among these, a hydrocarbon having 3 to 8 carbon atoms is preferred, and specific examples thereof include propane, n-butane, isobutane, n-pentane, isopentane, n-hexane, cyclohexane, propene, 1-butene, isobutene, trans-2-butene, cis-2-butene, 1-pentyne, 2-pentyne, 1-hexene, 2-hexene, benzene, toluene, xylene, ethylbenzene, heptane, cyclopentane, methylcyclopentane, methylcyclohexane, 1-pentene, 2-pentene, cyclohexene, and the like. As the organic solvent, it is possible to use one kind of organic solvent singly or to use two or more kinds of organic solvent in combination.

In the case of performing solution polymerization, the monomer concentration in a reaction solvent is preferably 5-50 mass % and more preferably 10-30 mass % from the viewpoint of maintaining the balance between productivity and easiness of polymerization control. The temperature of the polymerization reaction is preferably −20° C. to 150° C. and more preferably 0° C. to 120° C. In addition, the polymerization reaction is preferably performed at a pressure that is high enough to maintain the monomers substantially in a liquid phase. Such a pressure can be obtained by a method in which the inside of a reactor is pressurized with a gas that is inert for the polymerization reaction or the like.

The modifying agent for introducing the polar group having affinity for the filler (B) into the polymer (A1) is preferably a modifying agent having at least one atom selected from a silicon atom, a nitrogen atom, and an oxygen atom and more preferably a modifying agent having a silicon atom and an oxygen atom, a silicon atom and a nitrogen atom, or a silicon atom, a nitrogen atom, and an oxygen atom in one molecule.

For example, from the viewpoint of having high affinity for the filler (B) (for example, silica) described below, the modifying agent is preferably an alkoxysilane compound. Specific examples of the alkoxysilane compound include 3-dimethylaminopropyltriethoxysilane, N,N-bis(trimethylsilyl)aminopropylmethyldiethoxysilane, bis(diethoxymethylsilylpropyl)-N-methylamine, N-(1,3-dimethylbutylidene)-3-(triethoxysilyl)-1-propaneamine, tetramethoxysilane, tetraethoxysilane, tetra-n-propoxysilane, tetraisopropoxysilane, tetra-n-butoxysilane, tetraisobutoxysilane, tetra-sec-butoxysilane, tetra-tert-butoxysilane, methyltrimethoxysilane, methyltriethoxysilane, methyltripropoxysilane, methyltriisopropoxysilane, ethyltrimethoxysilane, ethyltriethoxysilane, ethyltripropoxysilane, ethyltriisopropoxysilane, propyltrimethoxysilane, propyltriethoxysilane, propyltripropoxysilane, propyltriisopropoxysilane, butyltrimethoxysilane, butyltriethoxysilane, phenyltrimethoxysilane, phenyltriethoxysilane, dimethyldimethoxysilane, methylphenyldimethoxysilane, dimethyldiethoxysilane, vinyltrimethoxysilane, vinyltriethoxysilane, divinyldiethoxysilane, and the like. Among these, 3-dimethylaminopropyltriethoxysilane, N,N-bis(trimethylsilyl)aminopropylmethyldiethoxysilane, bis(diethoxymethylsilylpropyl)-N-methylamine, N-(1,3-dimethylbutylidene)-3-(triethoxysilyl)-1-propaneamine, tetraethoxysilane, methyltriethoxysilane, and dimethyldiethoxysilane are preferred. One kind of the alkoxysilane compound may be used singly or two or more kinds of the alkoxysilane compounds may be used in combination.

1.1.2. Polymer (A2)

The polymer composition according to the present embodiment contains the polymer (A2) as the diene-based polymer (A). The polymer (A2) contains a repeating unit derived from a conjugate diene compound and a repeating unit derived from an aromatic vinyl compound.

The conjugate diene compound that is used in polymerization is not particularly limited as long as the conjugate diene compound contains 1,3-butadiene. 1,3-Butadiene may be used singly or 1,3-butadiene and another conjugate diene compound may be used in combination, but 1,3-butadiene is preferably used singly. As another conjugate diene compound, it is possible to exemplify the same compounds as the compounds enumerated in the description of the polymer (A1). Among these conjugate diene compounds, isoprene and 2,3-dimethyl-1,3-butadiene are preferred.

As the aromatic vinyl compound that is used in polymerization, it is possible to exemplify the same compounds as the compounds enumerated in the description of the polymer (A1). Among these, styrene is preferred. One kind of the aromatic vinyl compound may be used singly or two or more kinds of the aromatic vinyl compounds may be used in combination.

When the content of all of the repeating units in the polymer (A2) is set to 100 mass %, the content of the repeating unit derived from the conjugate diene compound is preferably 50-70 mass %, more preferably 50-65 mass %, and particularly preferably 55-65 mass %.

The vinyl content of the polymer (A2) needs to be 5-30 mass % and is preferably 10-30 mass %, more preferably 15-30 mass %, and particularly preferably 20-30 mass %. When the vinyl content of the polymer (A2) is within the above-described range, it is easy to obtain more excellent low-loss properties, wear resistance, wet grip performance, and mechanical characteristics. The vinyl content (the amount of a 1,2-coupled butadiene unit) of the polymer can be measured by an infrared absorption spectral analysis.

When the content of all of the repeating units in the polymer (A2) is set to 100 mass %, the content of the repeating unit derived from the aromatic vinyl compound (aromatic vinyl content) is 30-50 mass %, preferably 35-50 mass %, and more preferably 35-45 mass %. When the aromatic vinyl content of the polymer (A2) is set in the above-described range as described above, it is possible to obtain more excellent wear resistance and more excellent mechanical strength (operation stability). The polymer (A2) becomes advantageous in terms of wear resistance and mechanical strength, but is likely to be disadvantageous in terms of low-hysteresis loss characteristics. However, the number of terminals is decreased by increasing the molecular weight of the polymer (A2), and the polymer (A1) having a high modification rate and a low molecular weight is jointly used, whereby the balance among low-loss properties, wet grip performance, and mechanical characteristics becomes favorable.

The polymer (A2) may have a repeating unit derived from a different monomer other than the repeating unit derived from the conjugate diene compound and the repeating unit derived from the aromatic vinyl compound. Examples of the different monomer include acrylonitrile, methyl (meth)acrylate, ethyl (meth)acrylate, hydroxyethyl (meth)acrylate, and the like. The percentage content of the repeating unit derived from the different monomer is preferably set to 10 mass % or less and more preferably set to 5 mass % or less when the total of all of the repeating units is set to 100 mass %.

The polymer (A2) preferably has a branched structure. When the polymer (A2) has a branched structure, it is possible to obtain more excellent wear resistance and more excellent mechanical characteristics.

The peak temperature of the tan δ temperature dispersion curve of the polymer (A2) is preferably −30° C. or higher and 10° C. or lower, more preferably −25° C. or higher and 5° C. or lower, and particularly preferably −25° C. or higher and 0° C. or lower. When the peak temperature of the tan δ temperature dispersion curve of the polymer (A2) is within the above-described range, there is a case where the balance between low-loss properties and wet grip performance becomes more favorable. The tan δ temperature dispersion curve of the rubber component can be measured using, for example, a viscoelastic spectrometer from Toyo Seiki Seisaku-sho, Ltd. under conditions of a strain of 1% and a frequency of 50 Hz.

The polymer (A2) may be modified with a polar group having affinity for the filler (B). The polar group having affinity for the filler (B) is not particularly limited, but is preferably a functional group containing one or more elements selected from oxygen, sulfur, phosphorus, nitrogen, and tin. Among such functional groups, a functional group containing one or more elements selected from oxygen and nitrogen is more preferred.

The polymer (A2) may be fully made of a polymer modified with the polar group having affinity for the filler (B) (modified polymer) or also may be made of a mixture of the modified polymer and a non-modified polymer. The modification rate of the polymer (A2) by the polar group having affinity for the filler (B) is preferably more than 0% and 30% or less, more preferably 1-25%, and particularly preferably 5-25%.

The peak molecular weight in terms of polystyrene measured by gel permeation chromatography of the polymer (A2) is 400,000 to 2,000,000, preferably 450,000 to 2,000,000 and more preferably 500,000 to 1,500,000. When the peak molecular weight of the polymer (A2) is the lower limit or more, it is easy to obtain favorable fracture resistance. On the other hand, when the peak molecular weight of the polymer (A2) is the upper limit or less, it is easy to obtain favorable processing characteristics.

The peak molecular weight of the polymer (A2) is preferably larger than the peak molecular weight of the polymer (A1). For example, in a case where the modification rates of the polymer (A1) and the polymer (A2) are substantially identical to each other, it is possible to increase the polar group concentration per unit mass of the polymer (A1) to be higher than the polar group concentration per unit mass of the polymer (A2) by forming the above-described relationship of the peak molecular weights. In such a case, a larger amount of the filler (B) is unevenly distributed in the polymer (A1) phase, and it is easy to obtain more excellent low-loss properties, wear resistance, wet grip performance, and mechanical characteristics.

The molecular weight distribution, that is, the ratio (Mw/Mn) of the weight-average molecular weight (Mw) to the number-average molecular weight (Mn) of the polymer (A2) is preferably 1.5-3.0, more preferably 1.5-2.5, and particularly preferably 1.5-2.2. When the molecular weight distribution of the polymer (A2) is within the above-described range, it is easy to obtain more excellent low-loss properties, wear resistance, wet grip performance, and mechanical characteristics.

When the content of the entire rubber component is set to 100 mass %, the percentage content of the polymer (A2) is preferably 20-80 mass %, more preferably 20-70 mass %, and particularly preferably 30-50 mass %. The percentage content of the polymer (A2) is advantageously within the above-described range since it is possible to obtain more excellent low-loss properties, wear resistance, wet grip performance, and mechanical characteristics.

In the polymer composition according to the present embodiment, the mass ratio between the percentage contents of the polymer (A1) and the polymer (A2), which are contained as the diene-based polymer (A), is preferably 20:80-80:20 (polymer (A1):polymer (A2)). The percentage contents of the polymer (A1) and the polymer (A2) are advantageously within the above-described range since it is possible to obtain more excellent low-loss properties, wear resistance, wet grip performance, and mechanical characteristics.

The polymer (A2) can be synthesized in the same manner as the method for synthesizing the polymer (A1).

1.1.3. Different Polymer

The polymer composition according to the present embodiment may contain a different diene-based polymer other than the polymer (A1) and the polymer (A2) as the diene-based polymer (A). Such a diene-based polymer is not particularly limited as long as the diene-based polymer has a repeating unit derived from a conjugate diene compound and does not correspond to the polymer (A1) and the polymer (A2), and examples thereof include natural rubber, polybutadiene, polyisoprene, ethylene-propylene-diene rubber, styrene-butadiene rubber, acrylonitrile-butadiene rubber, and the like.

1.2. Filler (B)

The polymer composition according to the present embodiment contains the filler (B). The filler (B) is not particularly limited and can be appropriately selected depending on the purpose, and examples thereof include a mixture of silica and carbon black and the like.

The proportion of the filler (B) used is preferably 30-150 parts by mass, more preferably 30-130 parts by mass, still more preferably 35-130 parts by mass, and particularly preferably 40-120 parts by mass with respect to 100 parts by mass of the diene-based polymer (A). When the proportion of the filler (B) used is the above-described lower limit value or more, it is easy to obtain sufficient wear resistance and sufficient wet grip performance. When the use rate of the filler (B) is the above-described upper limit value or less, it is easy to obtain sufficient low-loss properties.

<Silica>

Examples of the silica include wet silica (hydrous silicic acid), dry silica (silicic anhydride), calcium silicate, aluminum silicate, and the like. Among these, wet silica is preferred. The proportion of the silica used is preferably 30-130 parts by mass, more preferably 40-120 parts by mass, and particularly preferably 50-110 parts by mass with respect to 100 parts by mass of the rubber component. When the proportion of the silica used is the above-described lower limit value or more, it is easy to obtain sufficient wear resistance and sufficient wet grip performance. When the use rate of the silica is the above-described upper limit value or less, it is easy to obtain sufficient low-loss properties.

Furthermore, the proportion of the silica used is preferably 20 mass % or more and more preferably 50 mass % or more in 100 mass % of the filler component. The proportion of the silica used is advantageously within this range from the viewpoint of low-loss properties, wear resistance, and wet grip performance.

<Carbon Black>

The carbon black is not particularly limited, and it is possible to use ordinary carbon black that is blended into rubber compositions. Specific examples thereof include GPF, FEF, HAF, ISAF, SAF, and the like. Among these, ISAF, SAF, and HAF are preferred, and ISAF is more preferred.

The proportion of the carbon black used is preferably 0-130 parts by mass and more preferably 2-110 parts by mass with respect to 100 parts by mass of the rubber component.

1.3. Other Components

In the polymer composition according to the present embodiment, it is possible to use, depending on the intended purpose of the polymer composition, a different polymer such as a thermoplastic resin, a silane coupling agent, a crosslinking agent, an acidic compound, a spreading oil (process oil), an anti-aging agent, a vulcanization accelerator, and, additionally, if necessary, a well-known additive such as a vulcanization aid, a processing aid, an anti-scorch agent and zinc oxide, a softening agent, a colorant, a flame retardant, a lubricant, a foaming agent, a plasticizer, an antioxidant, an ultraviolet inhibitor, an antistatic agent, or an anti-coloring agent.

<Silane Coupling Agent>

Examples of the silane coupling agent include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane; 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropyl methacrylate monosulfide, 3-trimethoxysilylpropyl methacrylate monosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazolyltetrasulfide, 3-octanoylthio-1-propyltriethoxysilane, and the like. It is possible to singly use one kind of the compound or to use two or more kinds of the compounds in combination. In addition, among these, bis(3-triethoxysilylpropyl)trisulfide, bis(3-triethoxysilylpropyl)disulfide, 3-trimethoxysilylpropylbenzothiazolyltetrasulfide are preferred from the viewpoint of a reinforcement-improving effect.

The proportion of the silane coupling agent used is preferably 0.5-20 parts by mass with respect to 100 parts by mass of the filler (B). When the proportion of the silane coupling agent used is within the above-described range, it is possible to impart sufficient reinforcement and sufficient fracture resistance to a crosslinked polymer that is formed of the polymer composition and to improve the wear resistance of the crosslinked polymer.

<Crosslinking Agent>

Examples of the crosslinking agent include sulfur, sulfur halides, organic peroxides, quinonedioximes, organic polyvalent amine compounds, alkylphenol resins having a methylol group, and the like. Among these, ordinarily, sulfur is used as the crosslinking agent. The proportion of the crosslinking agent used is preferably 0.1-10 parts by mass and more preferably 0.5-5 parts by mass with respect to 100 parts by mass of the rubber component.

<Acidic Compound>

As the acidic compound, a saturated fatty acid having 12 to 24 carbon atoms and a metallic salt thereof are preferably used. Specific examples of the acidic compound include lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, and calcium salts, zinc salts, and the like of these saturated fatty acids. It is possible to singly use one kind of the acidic compound or to use two or more kinds of the acidic compounds in combination. Among these, stearic acid is preferred. The proportion of the acidic compound used is preferably 0.3-15 parts by mass with respect to 100 parts by mass of the rubber component.

<Other Additives>

Examples of the spreading oil include aroma oil, naphthenic oil, paraffin oil, and the like. The proportion of the spreading oil used is 0-50 parts by mass with respect to 100 parts by mass of the rubber component.

Examples of the anti-aging agent include N-(1,3-dimethylbutyl)-N'-phenyl-p-phenylenediamine and the like. The proportion of the anti-aging agent used is 0.5-5 parts by mass with respect to 100 parts by mass of the rubber component.

Examples of the vulcanization aid include zinc oxide and the like. The proportion of the vulcanization aid used is 1-5 parts by mass with respect to 100 parts by mass of the rubber component.

Examples of the vulcanization accelerator include a guanidine-based compound, an aldehyde-amine-based compound, an aldehyde-ammonia-based compound, a thiazole-based compound, a sulfenamide-based compound, a thiourea-based compound, a thiuram-based compound, a dithiocarbamate-based compound, a zantate-based compound, and other compounds. Preferred specific examples of the vulcanization accelerator include sulphenamide-based vulcanization accelerators such as N-cyclohexyl-2-benzothiadylsulfenamide (CBS) and N-tert-butyl-2-benzothiadylsulfenamide (TBBS). The proportion of the vulcanization accelerator used is appropriately determined in consideration of the kind and proportion of a basic compound used and is preferably 0.5-5 parts by mass with respect to 100 parts by mass of the rubber component.

1.4. Method for Producing Polymer Composition

The polymer composition according to the present embodiment can be prepared by kneading the individual components described above using, for example, a kneader such as a Plastomill, a Banbury mixer, a roll, or an internal mixer. For example, the polymer composition is preferably prepared by the following method.

<First Step>

In a first step, the filler (B) and the silane coupling agent, if necessary, are preferably kneaded together with the polymer (A1) and the polymer (A2). In addition, in the first step, if necessary, the different polymer (a polymer other than the polymer (A1) and the polymer (A2)), the spreading oil, the anti-aging agent, or the like is also kneaded together. In addition, in the first step, the acidic compound, which is considered to be preferably kneaded in a second step, may also be kneaded together.

When the filler (B) is fed in the first step, the dispersibility of the filler (B) is likely to become favorable, and there is a case where the low fuel consumption performance of a tire (crosslinked polymer) that is formed of a polymer composition to be obtained improves.

In addition, in a case where the silane coupling agent is fed in the first step, it is preferable that, first, the polymer (A1), the polymer (A2), the different polymer, and the filler (B) are kneaded, then, the silane coupling agent is added, and the components are further kneaded. Specifically, it is preferable that, first, the polymer (A1), the polymer (A2), the different polymer, the filler (B), and components that are fed in the first step, if necessary, except the silane coupling agent (specifically, the spreading oil, the acidic compound, and the anti-aging agent) are kneaded, then, the silane coupling agent is added (added later) to the kneaded substance, and the components are further kneaded.

The silane coupling agent is added later in the first step, whereby a polymer composition to be obtained becomes more excellent in terms of processability, and a crosslinked polymer that is formed of the polymer composition has more excellent low-hysteresis loss characteristics. In addition, in a case where the polymer composition contains silica as the filler (B), it is possible to make the dispersibility of the silica more favorable.

In the case of adding the silane coupling agent later, the addition timing of the silane coupling agent is appropriately determined in consideration of the proportions or the like of the polymer (A1), the polymer (A2), and the different polymer used depending on the kind of the silica, the proportion of the silica used, the kneading condition, and the like.

In addition, in the case of adding the silane coupling agent later, it is preferable that the polymer (A1), the polymer (A2), and the different polymer are blended and kneaded for 0.5 minutes to 10 minutes, then, the silane coupling agent is added, and the components are kneaded for 0.5 minutes to 10 minutes.

Examples of the kneader that is used in the first step include open or closed kneaders such as a Plastomill, a Banbury mixer, a roll, and an internal mixer. In addition, in the first step, the kneading temperature is set to 30° C. to 180° C. and is preferably 50° C. to 160° C.

In addition, in a case where the silane coupling agent is fed in the first step, the kneading method is not limited to a method in which the silane coupling agent is added later and kneaded, and a kneaded substance containing the silane coupling agent may also be obtained by a method in which the silane coupling agent is kneaded collectively with all of the other components that are fed in the first step. In addition, the kneading method may be a method in which a master batch in which the polymer (A1), silica as the filler (B), and the silane coupling agent are kneaded is produced and then the polymer (A2), the different polymer, and the additive are added thereto.

<Second Step>

The second step is a step in which at least the crosslinking agent is added to the kneaded substance obtained in the first step, and the kneaded substance and the crosslinking agent are kneaded, thereby obtaining a polymer composition. In this second step, the acidic compound is preferably kneaded together with the kneaded substance obtained in the first step and the crosslinking agent. In addition, in the second step, zinc oxide and the vulcanization accelerator are also kneaded together, if necessary. Furthermore, in the second step, ordinarily, the polymer composition is obtained by a method in which all of the components that are fed in the second step (specifically, the kneaded substance obtained in the first step, the crosslinking agent, and other components that are fed, if necessary, such as the acidic compound and zinc oxide or the vulcanization accelerator) are kneaded collectively.

The acidic compound is fed in the second step, whereby a polymer composition to be obtained becomes more excellent in terms of processability, and, additionally, a crosslinked polymer that is formed of the polymer composition has more excellent low-hysteresis characteristics. In addition, it is possible to make the dispersibility of the filler (B) more favorable.

In the second step, the kneader used in the first step is used. In addition, in the second step, the kneading temperature is set to 30° C. to 130° C. and is preferably 50° C. to 110° C.

A polymer composition to be obtained by the production method as described above is a non-vulcanized rubber composition and is subjected to a crosslinking treatment such as vulcanization to form a crosslinked polymer.

1.5. Uses

A crosslinked polymer that is formed of the polymer composition according to the present embodiment is preferably used as a tire, specifically, a tire tread. For a tire that is formed of the polymer composition according to the present embodiment, it is possible to obtain a high strength in the tread and also to obtain a desired shape in the tread, and thus excellent performance can be obtained. In addition, it is also possible to use a crosslinked polymer that is formed of the polymer composition according to the present embodiment as tire members other than a tread, anti-vibration rubber, fenders, belts, hoses, and other industrial products.

2. EXAMPLES

Hereinafter, specific examples of the present invention will be described, but the present invention is not limited to these examples. "%" in manufacturing examples, examples, and comparative examples described below is mass-based unless particularly otherwise described.

2.1. Synthesis Examples of Polymer (A1)

Synthesis Example of Polymer (A1-1)

Cyclohexane (2,500 g), tetrahydrofuran (11.36 ml), and 1,3-butadiene (500 g) were prepared in a nitrogen-substituted autoclave reactor having an internal capacity of five liters. The temperature of the contents in the reactor was adjusted to 35° C., and then n-butyllithium (5.15 mmol) was added thereto to initiate polymerization. The polymerization was performed under an adiabatic condition, and the peak temperature reached 85° C. At a point in time where the polymerization conversion rate reached 99% (after 20 minutes elapsed from the initiation of the polymerization), 1.3-butadiene (10 g) was added thereto for two minutes, and then N,N-bis(trimethylsilyl)aminopropylmethyldiethoxysilane (5.03 mmol) was added thereto to perform a reaction for 15 minutes. Next, 2,6-di-tert-butyl-p-cresol (3.96 g) was added to a polymer solution containing an obtained modified conjugate diene-based polymer. Next, desolventization was performed by steam stripping, and the solute was dried with a heat roll having a temperature adjusted to 110° C., thereby obtaining a polymer (A1-1). A variety of physical property values and the like of the obtained polymer (A1-1) are shown in Table 1.

Synthesis Example of Polymer (A1-2)

Cyclohexane (2,500 g), tetrahydrofuran (50 g), styrene (100 g), and 1,3-butadiene (390 g) were prepared in a nitrogen-substituted autoclave reactor having an internal capacity of five liters. The temperature of the contents in the reactor was adjusted to 10° C., and then n-butyllithium (5.20 mmol) was added thereto to initiate polymerization. The polymerization was performed under an adiabatic condition, and the peak temperature reached 85° C. At a point in time where the polymerization conversion rate reached 99% (after 20 minutes elapsed from the initiation of the polymerization), 1.3-butadiene (10 g) was added thereto for two minutes, and then N,N-bis(trimethylsilyl)aminopropylmethyldiethoxysilane (4.46 mmol) was added thereto to perform a reaction for 15 minutes. Next, 2,6-di-tert-butyl-p-cresol (2.0 g) was added to a polymer solution containing an obtained modified conjugate diene-based polymer. Next, desolventization was performed by steam stripping, and the solute was dried with a heat roll having a temperature adjusted to 110° C., thereby obtaining a polymer (A1-2). A variety of physical property values and the like of the obtained polymer (A1-2) are shown in Table 1.

Synthesis Example of Polymer (A1-3)

35% Hydrogen peroxide (97.5 g) and water (97.5 g) were mixed together, acetic anhydride (102 g) was added thereto, and the components were stirred with a magnetic stirrer for approximately 30 minutes while adjusting the reaction temperature with ice water so as to reach 20-30° C., thereby preparing peracetic acid. A surfactant (2 phr) and water were added to natural rubber latex (480 g, solid content: 60%) such that the solid content was adjusted to reach 30%, the components were stirred with a propeller stirring device for 10 minutes, then, the peracetic acid was added thereto for five minutes, and the components were stirred with the propeller stirring device for 30 minutes while adjusting the reaction temperature with ice water so as not to exceed 40° C., thereby performing a reaction. After that, the reaction product was solidified in methanol, made into a thin sheet, immersed in water for one night, washed with water again, and dried in a vacuum dryer set to 40° C. for two hours, thereby obtaining a polymer (A1-3) which was epoxidized natural rubber. A variety of physical property values and the like of the obtained polymer (A1-3) are shown in Table 1.

2.2. Synthesis Examples of Polymer (A2)

2.2. Synthesis Examples of Polymer (A2)

Synthesis Example of Polymer (A2-1)

As a polymerization reactor, used was a tank-type pressure vessel in which the internal capacity was 10 L, the ratio (L/D) of the height (L) to the diameter (D) of the inside was 4.0, the inlet was provided in the bottom portion, the outlet was provided in the top portion, and a stirrer that was a tank-type reactor equipped with a stirrer and a jacket for temperature control were provided. Styrene, 1,3-butadiene, and n-hexane, from which moisture had been removed in advance, were mixed together under conditions of 39.55 g/minute, 62.6 g/minute, and 68.1 g/minute, respectively. The components were mixed with a starting mixer provided in the middle of a pipe configured to supply this mixed solution to the inlet of a reactor and then continuously supplied to the bottom portion of the reactor. Furthermore, 2,2-bis(2-oxolanyl)propane, as a polar substance, and n-butyllithium, as a polymerization initiator, were supplied to the bottom portion of the polymerization reactor configured to intensively mix the components with the stirrer at rates of 0.0715 g/minute and 0.476 mmol/minute, respectively, and the polymerization reaction was continuously continued. The temperature was controlled such that the temperature of a polymer solution at the outlet in the top portion of the reactor reached 80° C. When the polymerization was sufficiently stabilized, a small amount of the polymer solution before the addition of a coupling agent was taken out from the outlet in the top portion of the reactor, an antioxidant (BHT) was added thereto such that the content reached 0.2 g per 100 g of the polymer, and then the solvent was removed.

Next, 1,4-bis[3-(triethoxysilyl)propyl]piperazine diluted to 2.74 mmol/L was continuously added as the coupling agent to the polymer solution that had flowed out from the outlet of the reactor at a rate of 0.230 mmol/minute and mixed by passing the coupling agent-added polymer solution through the starting mixer, thereby performing a coupling reaction. At this time, the time taken to add the coupling agent to the polymer solution that had flowed out from the outlet of the reactor was 4.8 minutes, the temperature was 68° C., and the difference between the temperature in the polymerization step and the temperature until the addition of a modifying agent was 7° C. The antioxidant (BHT) was continuously added to the coupling-reacted polymer solution at 0.055 g/minute (n-hexane solution) such that the content reached 0.2 g per 100 g of the polymer to finish the coupling reaction. At the same time as the antioxidant, an oil (JOMO PROCESS NC140 manufactured by JX Nippon Oil & Energy Corporation) was continuously added thereto such that the content reached 37.5 g per 100 g of the polymer and mixed with the starting mixer. The solvent was removed by steam stripping, thereby obtaining a modified conjugate diene-based polymer (A2-1). A variety of physical property values and the like of the obtained polymer (A2-1) are shown in Table 1.

Synthesis Example of Polymer (A2-2)

The same operations as in the synthesis example of (A2-1) were performed except that, as the polar substance, N,N,N',N'-tetramethylethylenediamine was added at a rate of 0.065 g/minute instead of 2,2-bis(2-oxolanyl)propane, and, as the coupling agent, silicon tetrachloride was added at a rate of 0.093 mmol/minute instead of 1,4-bis[3-(triethoxysilyl) propyl]piperazine, thereby obtaining a modified conjugate diene-based polymer (A2-2). A variety of physical property values and the like of the obtained polymer (A2-2) are shown in Table 1.

Synthesis Example of Polymer (A2-3)

Cyclohexane (2,500 g), tetrahydrofuran (50 g), styrene (200 g), and 1,3-butadiene (290 g) were prepared in a nitrogen-substituted autoclave reactor having an internal capacity of five liters. The temperature of the contents in the reactor was adjusted to 10° C., and then n-butyllithium (2.61 mmol) was added thereto to initiate polymerization. The polymerization was performed under an adiabatic condition, and the peak temperature reached 85° C. At a point in time where the polymerization conversion rate reached 99% (after 20 minutes elapsed from the initiation of the polymerization), 1,3-butadiene (10 g) was added thereto for two minutes, then, silicon tetrachloride (0.45 mmol) was added thereto to perform a reaction for 10 minutes, and furthermore, N,N-bis(trimethylsilyl)aminopropylmethyldiethoxysilane (2.08 mmol) was added thereto to perform a reaction for 15 minutes. Next, 2,6-di-tert-butyl-p-cresol (2.0 g) was added to a polymer solution containing an obtained modified conjugate diene-based polymer. Next, desolventization was performed by steam stripping, and the solute was dried with a heat roll having a temperature adjusted to 110° C., thereby obtaining a polymer (A2-3). A variety of physical property values and the like of the obtained polymer (A2-3) are shown in Table 1.

2.3. Synthesis Examples of Different Polymers

Synthesis Example of Polymer (A3-1)

The same operations as for (A1-1) were performed except that N,N-bis(trimethylsilyl)aminopropylmethyldiethoxysilane (5.03 mmol) was not used, thereby obtaining a polymer (A3-1). A variety of physical property values and the like of the obtained polymer (A3-1) are shown in Table 1.

Synthesis Example of Polymer (A3-2)

The same operations as for (A1-2) were performed except that N,N-bis(trimethylsilyl)aminopropylmethyldiethoxysilane (4.46 mmol) was not used, thereby obtaining a polymer (A3-2). A variety of physical property values and the like of the obtained polymer (A3-2) are shown in Table 1.

Synthesis Example of Polymer (A3-3)

As a polymerization reactor, used was a tank-type pressure vessel in which the internal capacity was 10 L, the ratio (L/D) of the height (L) to the diameter (D) of the inside was 4.0, the inlet was provided in the bottom portion, the outlet was provided in the top portion, and a stirrer that was a tank-type reactor equipped with a stirrer and a jacket for temperature control were provided. 1,3-Butadiene, styrene, and n-hexane, from which moisture had been removed in advance, were mixed together under conditions of 17.9 g/minute, 9.8 g/minute, and 145.3 g/minute, respectively. The components were mixed in a starting mixer provided in the middle of a pipe configured to supply this mixed solution to the inlet of a reactor and then continuously supplied to the bottom portion of the reactor. Furthermore, 2,2-bis(2-oxolanyl)propane, as a polar substance, and n-butyllithium, as a polymerization initiator, were supplied to the bottom portion of the polymerization reactor configured to intensively mix the components with the stirrer at rates of 0.0194 g/minute and 0.255 mmol/minute, respectively, and the polymerization reaction was continuously continued. The temperature was controlled such that the temperature of a polymer solution at the outlet in the top portion of the reactor reached 75° C. When the polymerization was sufficiently stabilized, a small amount of the polymer solution before the addition of a coupling agent was taken out from the outlet in the top portion of the reactor, an antioxidant (BHT) was added thereto such that the content reached 0.2 g per 100 g of the polymer, and then the solvent was removed.

Next, 1,4-bis[3-(triethoxysilyl)propyl]piperazine was continuously added as the coupling agent to the polymer solution that had flowed out from the outlet of the reactor at a rate of 0.126 mmol/minute and mixed by passing the coupling agent-added polymer solution through the starting mixer, thereby performing a coupling reaction. The antioxidant (BHT) was continuously added to the coupling-reacted polymer solution at 0.055 g/minute (n-hexane solution) such that the content reached 0.2 g per 100 g of the polymer to finish the coupling reaction. At the same time as the antioxidant, an oil (JOMO PROCESS NC140 manufactured by JX Nippon Oil & Energy Corporation) was continuously added thereto such that the content reached 37.5 g per 100 g of the polymer and mixed with the starting mixer. The solvent was removed by steam stripping, thereby obtaining a modified conjugate diene-based polymer (A3-3). A variety of physical property values and the like of the obtained polymer (A3-3) are shown in Table 1.

2.4. Method for Measuring Physical Properties

<Measurement of Number-Average Molecular Weight (Mn) and Weight-Average Molecular Weight (Mw)>

For each of the polymers produced above, the number-average molecular weight (Mn) and weight-average molecular weight (Mw) in terms of polystyrene were calculated from a holding time that corresponded to the apex of the maximum peak of a GPC curve obtained using gel permeation chromatograph (GPC) ("HLC-8120" manufacture by Tosoh Corporation) under the following GPC conditions.

(GPC conditions)

Column: Two "GMHXL" (trade name, manufactured by Tosoh Corporation)

Column temperature: 40° C.

Mobile phase: Tetrahydrofuran

Flow rate: 1.0 ml/minute

Sample concentration: 10 mg/20 ml

<Measurement of Vinyl Content and Bound Styrene Content>

Vinyl content (%): Measured by $^1$H-NMR measurement at 400 MHz.

Bound styrene content (%): Measured by $^1$H-NMR measurement at 400 MHz. The bound styrene content is a parameter corresponding to the aromatic vinyl content.

<Addition Rate of Modifying Agent>

The mole percentage of a terminal modifying agent with respect to the added n-butyllithium expressed as a percentage. Here, the polymer (A1-3) was excessively modified with respect to the number of molecules and was thus expressed as "(100%)" in Table 1.

2.5. Examples 1 to 4 and Comparative Examples 1 to 7

2.5.1. Production of Polymer Compositions and Crosslinked Polymers

Individual components were blended according to blending formulae shown in Table 2 and kneaded to produce polymer compositions. The kneading was performed by the following method.

As a first step (first stage of kneading), the individual components blended according to Table 2, that is, all of the components that were supposed to be fed in the step 1 were collectively kneaded using a Plastomill (internal capacity: 250 ml) equipped with a temperature control device under conditions of a rotation speed of 60 rpm and a kneading time of four minutes. Next, as the second step (second stage of kneading), kneaded substances obtained in the first step were cooled to room temperature, then, individual components were added and blended into the Plastomill (internal capacity: 250 ml) equipped with a temperature control device under conditions of a rotation speed of 60 rpm and a kneading time of 1.5 minutes, thereby obtaining individual polymer compositions of Examples 1 to 4 and Comparative Examples 1 to 7.

Next, the obtained individual polymer compositions were molded and subjected to vulcanization molding by vulcanizing press at 160° C. for a predetermined time, thereby obtaining individual crosslinked polymers having a predetermined shape that were to be subjected to the following evaluation tests.

2.5.2. Evaluation of Polymer Compositions and Crosslinked Polymers

The following evaluation tests were performed on the obtained individual polymer compositions and individual crosslinked polymers. The results are shown in Table 2.

<Evaluation Test of Low-Hysteresis Loss Characteristics>

The obtained crosslinked polymers were used as measurement specimens, and 50° C. tan δ was measured using an ARES viscoelasticity tester (manufactured by TA Instruments) under conditions of a shear dynamic strain of 3.0%, an angular rate of 100 radian per second, and 50° C. In Table 2, the measurement values of the 50° C. tan δ are shown as indexes in a case where the measurement value according to Comparative Example 1 (specifically, the measurement value of the crosslinked polymer formed of the polymer composition of Comparative Example 1) is set to 100 as a standard. The 50° C. tan δ indicates that the low-hysteresis loss characteristics becomes smaller and more favorable as the numerical value increases.

<Evaluation Test of Wet Grip Performance>

The obtained crosslinked polymers were used as measurement specimens, and 0° C. tan δ was measured using an ARES viscoelasticity tester (manufactured by TA Instruments) under conditions of a tensile dynamic strain of 0.14%, an angular rate of 100 radian per second, and 0° C. In Table 2, the measurement values of the 0° C. tan δ are shown as indexes in a case where the measurement value according to Comparative Example 1 (specifically, the measurement value of the crosslinked polymer formed of the polymer composition of Comparative Example 1) is set to 100 as a standard. The 0° C. tan δ indicates that the wet grip performance becomes greater and more favorable as the numerical value increases.

<Evaluation Test of Wear Resistance>

The obtained crosslinked polymers were used as measurement specimens, and the wear resistance was measured under a load of 10 N at 25° C. using a DIN wear tester (manufactured by Toyo Seiki Seisaku-sho, Ltd.) according to JIS K 6264. In Table 2, the measurement values are shown as indexes in a case where the measurement value according to Comparative Example 1 (specifically, the measurement value of the crosslinked polymer formed of the polymer composition of Comparative Example 1) is set to 100 as a standard. It is indicated that the wear resistance becomes more favorable as the numerical value increases.

<Evaluation Test of Operation Stability>

The obtained crosslinked polymers were used as measurement specimens, and the operation stability was measured at a frequency of 10 Hz and 23° C. using an ARES viscoelasticity tester (manufactured by TA Instruments). The measurement values of the complex dynamic shear modulus (G*(10%)) are shown as indexes in a case where the measurement value according to Comparative Example 1 (specifically, the measurement value of the crosslinked polymer formed of the polymer composition of Comparative Example 1) is set to 100 as a standard. It is indicated that the stiffness at a low strain becomes higher, and the operation stability becomes more favorable as the numerical value increases.

<Evaluation Test of Tensile Strength>

The obtained crosslinked polymers were used as measurement specimens, and the tensile strengths were measured at a temperature of 25° C. according to JIS K 6301. The tensile strengths are shown as indexes in a case where the measurement value according to Comparative Example 1 (specifically, the measurement value of the crosslinked polymer formed of the polymer composition of Comparative Example 1) is set to 100 as a standard. It is indicated that the tensile strength becomes greater as the index increases, and the tensile strength becomes more favorable as the numerical value increases.

<Evaluation Test of Processability>

The Mooney viscosities of the obtained polymer compositions were measured according to JIS K 6300-1:2001 using an L-type rotor in a Mooney viscometer under conditions of a preheating time of one minute, a rotor rotation time of four minutes, and 100° C. The obtained results are shown as indexes in a case where the value in Comparative Example 1 is set to 100. It means that, as the index increases, the viscosity becomes smaller, and the molding processability becomes more favorable.

2.6. Evaluation Results

The physical property values of the individual polymers synthesized above are shown in Table 1. The compositions and evaluation results of the individual polymer compositions are shown in Table 2.

TABLE 1

| Kind of polymer | A1-1 | A1-2 | A1-3 | A2-1 | A2-2 | A2-3 | A3-1 | A3-2 | A3-3 |
|---|---|---|---|---|---|---|---|---|---|
| Bound styrene content (%) | 0 | 20 | 0 | 35 | 35 | 40 | 0 | 20 | 35 |
| Vinyl content (%) | 39 | 56 | 0 | 28 | 25 | 25 | 39 | 56 | 42 |
| Modifying agent addition rate (mol %) | 97% | 86% | (100%) | 48% | — | 80% | — | — | 49% |
| Weight-average molecular weight (Mw) (10,000) | 29 | 34 | 118 | 112 | 116 | 83 | 30 | 27 | 110 |
| Number-average molecular weight (Mn) (10,000) | 19 | 20 | 17 | 60 | 66 | 50 | 19 | 20 | 53 |

TABLE 2

| | | | | Example 1 | Example 2 | Example 3 | Example 4 | Comparative Example 1 | Comparative Example 2 |
|---|---|---|---|---|---|---|---|---|---|
| Compositions of polymer compositions | First step | Polymer (A1) | Polymer (A1-1) (parts by mass) | 35 | | | | | 35 |
| | | | Polymer (A1-2) (parts by mass) | | 35 | | 35 | 70 | |
| | | | Polymer (A1-3) (parts by mass) | | | 20 | | | |
| | | Polymer (A2) | Polymer (A2-1) (parts by mass) | 35 | 35 | | | | |
| | | | Polymer (A2-2) (parts by mass) | | | 50 | | | |
| | | | Polymer (A2-3) (parts by mass) | | | | 35 | | |
| | | Polymer (A3) | Polymer (A3-1) (parts by mass) | | | | | | |
| | | | Polymer (A3-2) (parts by mass) | | | | | | |
| | | | Polymer (A3-3) (parts by mass) | | | | | | 35 |
| | | | Polymer (A3-4) (parts by mass) | 30 | 30 | 30 | 30 | 30 | 30 |
| | | Filler (B) | Silica (parts by mass) | 50 | 50 | 50 | 50 | 50 | 50 |
| | | Spreading oil (parts by mass) | | 10 | 10 | 10 | 10 | 10 | 10 |
| | | Silane coupling agent (parts by mass) | | 4 | 4 | 4 | 4 | 4 | 4 |
| | | Stearic acid (parts by mass) | | 2 | 2 | 2 | 2 | 2 | 2 |
| | | Anti-aging agent (parts by mass) | | 1 | 1 | 1 | 1 | 1 | 1 |
| | Second step | Zinc oxide (parts by mass) | | 3 | 3 | 3 | 3 | 3 | 3 |
| | | Vulcanization accelerator D (parts by mass) | | 1.5 | 1.5 | 1.5 | 1.5 | 1.5 | 1.5 |
| | | Vulcanization accelerator CZ (parts by mass) | | 1.8 | 1.8 | 1.8 | 1.8 | 1.8 | 1.8 |
| | | Sulfur (parts by mass) | | 1.5 | 1.5 | 1.5 | 1.5 | 1.5 | 1.5 |
| Evaluation tests | Low-loss properties | | | 103 | 106 | 99 | 100 | 100 | 97 |
| | Wet grip performance | | | 100 | 102 | 102 | 98 | 100 | 96 |
| | Wear resistance | | | 119 | 125 | 125 | 123 | 100 | 88 |
| | Operation stability | | | 120 | 117 | 124 | 118 | 100 | 93 |
| | Tensile strength | | | 110 | 98 | 99 | 107 | 100 | 101 |
| | Processability | | | 107 | 105 | 110 | 101 | 100 | 99 |

| | | | | Comparative Example 3 | Comparative Example 4 | Comparative Example 5 | Comparative Example 6 | Comparative Example 7 |
|---|---|---|---|---|---|---|---|---|
| Compositions of polymer compositions | First step | Polymer (A1) | Polymer (A1-1) (parts by mass) | | | | | |
| | | | Polymer (A1-2) (parts by mass) | | 35 | | | |
| | | | Polymer (A1-3) (parts by mass) | | | | 35 | |
| | | Polymer (A2) | Polymer (A2-1) (parts by mass) | 35 | | | | |
| | | | Polymer (A2-2) (parts by mass) | | | 50 | | |
| | | | Polymer (A2-3) (parts by mass) | | | | | 35 |
| | | Polymer (A3) | Polymer (A3-1) (parts by mass) | 35 | | | | |
| | | | Polymer (A3-2) (parts by mass) | | | | | 35 |
| | | | Polymer (A3-3) (parts by mass) | | 35 | | 35 | |
| | | | Polymer (A3-4) (parts by mass) | 30 | 30 | 50 | 30 | 30 |
| | | Filler (B) | Silica (parts by mass) | 50 | 50 | 50 | 50 | 50 |
| | | Spreading oil (parts by mass) | | 10 | 10 | 10 | 10 | 10 |
| | | Silane coupling agent (parts by mass) | | 4 | 4 | 4 | 4 | 4 |
| | | Stearic acid (parts by mass) | | 2 | 2 | 2 | 2 | 2 |
| | | Anti-aging agent (parts by mass) | | 1 | 1 | 1 | 1 | 1 |
| | Second step | Zinc oxide (parts by mass) | | 3 | 3 | 3 | 3 | 3 |
| | | Vulcanization accelerator D (parts by mass) | | 1.5 | 1.5 | 1.5 | 1.5 | 1.5 |
| | | Vulcanization accelerator CZ (parts by mass) | | 1.8 | 1.8 | 1.8 | 1.8 | 1.8 |
| | | Sulfur (parts by mass) | | 1.5 | 1.5 | 1.5 | 1.5 | 1.5 |
| Evaluation tests | Low-loss properties | | | 87 | 98 | 82 | 96 | 85 |
| | Wet grip performance | | | 83 | 100 | 81 | 96 | 84 |
| | Wear resistance | | | 106 | 102 | 116 | 94 | 113 |
| | Operation stability | | | 110 | 99 | 115 | 97 | 108 |
| | Tensile strength | | | 99 | 105 | 92 | 102 | 101 |
| | Processability | | | 103 | 87 | 94 | 95 | 86 |

In Table 2, the numerical values for the individual components in the compositions of the polymer compositions have a unit of "parts by mass". As individual materials shown in Table 2, the following products were used, respectively.

Silica: Trade name "ZEOSIL 1165MP" manufactured by Rhodia S. A.

Polymer (A3-4): Natural rubber, RSS #3

Spreading oil: Trade name "JOMO PROCESS NC-140" manufactured by Japan Energy Corporation Silane coupling agent: Trade name "Si75" manufactured by Evonik Anti-aging agent: Trade name "OZONONE 6C" manufactured by Seiko Chemical Co., Ltd., N-(1,3-dimethylbutyl)-N'-phenyl-p-phenylenediamine Vulcanization accelerator D: Trade name "NOCCELER D" manufactured by Ouchi Shinko Chemical Industrial Co., Ltd., 1,3-diphenyl guanidine Vulcanization accelerator CZ: Trade name "NOCCELER CZ" manufactured by Ouchi Shinko Chemical Industrial Co., Ltd., N-cyclohexyl-2-benzothiazolylsulfenamide From the results of Table 2, it was confirmed that it was possible to obtain crosslinked polymers capable of highly satisfying all of excellent low-loss properties, wet grip performance, wear resistance, and mechanical characteristics from the polymer compositions according to Examples 1 to 4 compared with the polymer compositions of Comparative Examples 1 to 7.

The present invention is not limited to the above-described embodiment and can be modified in a variety of manners. The present invention includes a configuration that is substantially the same as the configuration described in the embodiment (for example, a configuration having the same function, method, and result or a configuration having the same objective and effect). In addition, the present invention includes a configuration in which an inessential part of the configuration described in the above-described embodiment is substituted into another configuration. Furthermore, the present invention also includes a configuration exhibiting the same action and effect or a configuration capable of achieving the same objective as the configuration described in the above-described embodiment. Moreover, the present invention also includes a configuration obtained by adding a well-known technique to the configuration described in the above-described embodiment.

The invention claimed is:

1. A polymer composition comprising:
a diene-based polymer (A); and
a filler (B),
wherein the diene-based polymer (A) contains a polymer (A1) and a polymer (A2),
polymer (A1): a diene-based polymer that is a polymer of a conjugate diene compound or a copolymer of a conjugate diene compound and an aromatic vinyl compound, the diene-based polymer being modified with a polar group having affinity for the filler (B), in which an aromatic vinyl content is 25 mass % or less, and a modification rate is 30-100%, and
polymer (A2): a diene-based polymer that is a copolymer of an aromatic vinyl compound and a conjugate diene compound containing 1,3-butadiene, in which an aromatic vinyl content is 30-50 mass %, a vinyl content is 5-30 mass %, and a peak molecular weight in terms of polystyrene measured by gel permeation chromatography is 400,000 to 2,000,000, and
a ratio of a weight-average molecular weight to a number-average molecular weight of the polymer (A2) is 1.5 to 3.0.

2. The polymer composition according to claim 1, wherein the polar group in the polymer (A1) that has affinity for the filler (B) is a functional group having one or more elements selected from oxygen, sulfur, phosphorus, nitrogen, and tin.

3. The polymer composition according to claim 1, wherein a peak molecular weight of the polymer (A1) is 5,000 to 300,000.

4. The polymer composition according to claim 1, wherein the polymer (A2) is a modified polymer modified with a polar group having affinity for the filler (B), and a modification rate of the polymer (A2) is greater than 0% and 30% or less.

5. The polymer composition according to claim 1, wherein a mass ratio between the polymer (A1) and the polymer (A2), polymer (A1):polymer (A2), in the diene-based polymer (A) is 20:80 to 80:20.

6. The polymer composition according to claim 1, comprising:
30 to 150 parts by mass of the filler (B) with respect to 100 parts by mass of the diene-based polymer (A).

7. The polymer composition according to claim 1, further comprising:
a crosslinking agent.

8. A crosslinked polymer produced using the polymer composition according to claim 7.

9. A tire, wherein the crosslinked polymer according to claim 8 is used.

* * * * *